(12) United States Patent
Desbiolles et al.

(10) Patent No.: US 7,370,482 B2
(45) Date of Patent: May 13, 2008

(54) RAPIDLY REGENERATING CRYOGENIC TRAP

(75) Inventors: Jean-Pierre Desbiolles, Cruseilles (FR); Gloria Sogan, Epagny (FR); Sébastien Munari, Cran-Gevrier (FR); Emmanuelle Veran, Aix les Bains (FR)

(73) Assignee: Alcatel, Paris (FR)

( * ) Notice: Subject to any disclaimer, the term of this patent is extended or adjusted under 35 U.S.C. 154(b) by 299 days.

(21) Appl. No.: 10/515,259

(22) PCT Filed: May 30, 2003

(86) PCT No.: PCT/FR03/01637

§ 371 (c)(1), (2), (4) Date: Nov. 23, 2004

(87) PCT Pub. No.: WO03/101576

PCT Pub. Date: Dec. 11, 2003

(65) Prior Publication Data

US 2005/0235656 A1    Oct. 27, 2005

(30) Foreign Application Priority Data

May 30, 2002  (FR) .................................. 02 06642

(51) Int. Cl.
*B01D 8/00* (2006.01)
(52) U.S. Cl. ...................................................... 62/55.5
(58) Field of Classification Search .................. 62/55.5
See application file for complete search history.

(56) References Cited

U.S. PATENT DOCUMENTS

| | | | |
|---|---|---|---|
| 3,721,101 A * | 3/1973 | Sheppard et al. ............. 62/56 |
| 4,356,701 A * | 11/1982 | Bartlett et al. ............. 62/55.5 |
| 4,724,677 A * | 2/1988 | Foster ......................... 62/55.5 |
| 4,757,689 A | 7/1988 | Bachler et al. |
| 4,763,483 A | 8/1988 | Olsen |
| 5,305,612 A * | 4/1994 | Higham et al. ............. 62/55.5 |
| 5,819,545 A * | 10/1998 | Eacobacci et al. .......... 62/55.5 |
| 6,116,032 A * | 9/2000 | Mori et al. .................. 62/55.5 |
| 6,158,226 A * | 12/2000 | Noji et al. .................. 62/55.5 |
| 6,327,863 B1 * | 12/2001 | Yamartino et al. .......... 62/55.5 |

FOREIGN PATENT DOCUMENTS

JP        10-077967 A        3/1998

OTHER PUBLICATIONS

Patent Abstracts of Japan, vol. 1998, No. 8, Jun. 30, 1998 (corresponding to JP 10-077967).

\* cited by examiner

*Primary Examiner*—William C Doerrler
(74) *Attorney, Agent, or Firm*—Sughrue Mion, PLLC (57) ABSTRACT

The cryogenic trap of the invention comprises, in a hollow body (3) having an access valve (2) and an outlet valve (6), a cold core (11) associated with a plate (13) having low thermal inertia and movable between a trapping position in contact with the cold core (11), and a regeneration position spaced apart from the cold core (11) and in contact with a heater ring (14). The plate (13) is in contact with gases to be trapped, and prevents them from passing to the cold core (11). Regeneration requires heating only of the plate (13) carrying the condensed and solidified gases, and it is therefore more rapid.

21 Claims, 6 Drawing Sheets

RAPIDLY REGENERATING CRYOGENIC TRAP

TECHNICAL FIELD OF THE INVENTION

Chambers in installations for fabricating semiconductor components contain gases coming from air locks or from process chambers.

Those gases need to be removed in order to avoid subsequently polluting semiconductor wafers inserted into transfer chambers before or after treatment.

Gases are removed by mechanical pumping, often associated with a cryogenic trap, by performing selective pumping.

A cryogenic trap comprises a contact surface cooled and maintained at very low temperature by a cold source, and placed in contact with the pumped gases. The pumped gazes are thus caused to condense and solidify on said contact surface, and are thus withdrawn from the inside atmosphere.

The cryogenic traps commonly in use comprise a cold mass placed in contact with the gases of the chamber, and itself cooled by a cold finger thermally connected to a cold generator. The contact surface is the surface of the cold mass itself.

The problem is that in condensing, gases, and in particular water, produce a thick layer of ice on the cryogenic trap, which layer remains in place and progressively reduces the capacity of the cryogenic trap to freeze and its capacity to trap the gases that are to be eliminated.

It is therefore necessary to regenerate the cryogenic trap periodically, by preheating it to remove the ice.

For regeneration purposes, it is necessary to reheat the mass and the cold finger. During this heating stage, the trap is inactive and it releases previously-trapped materials into the inside atmosphere. This leads to a relatively long period of time, about two hours, between two successive operational states, during which time the ice is eliminated and the cryogenic trap is returned to operating at low temperature. The entire installation needs to be stopped so as to avoid defects due to back pollution resulting from the cryogenic trap not operating and to the release of trapped materials. In present-day devices, this means that it is not possible to regenerate the trap frequently. It is therefore necessary to tolerate the trap operating at reduced efficiency.

In order to regenerate a cryogenic trap more rapidly, document JP 10 077967 A discloses a moving contact surface in the form of a deformable diaphragm having its periphery secured to the wall of the hollow body and carrying an intermediate ring that is moved towards and away from a cold core by coils having shape memory. The diaphragm is in continuous thermal connection firstly with the peripheral wall of the hollow body, and secondly with the shape memory coils which are themselves heated by passing an electric current delivered by an electrical conductor. During regeneration steps, the diaphragm is heated by the heat given off by the shape memory coils. The assembly thus presents a relatively high level of thermal inertia. In addition, the presence of the diaphragm makes it necessary to provide additional pumping means in order to balance the gas pressures on either side of the diaphragm. Such a system is thus complex and does not enable regeneration to be performed sufficiently rapidly to enable it to take place in non-critical time between two successive stages of activity in a device for fabricating semiconductor components.

Document U.S. Pat. No. 4,763,483 describes an inverse solution, in which the contact surface is stationary, being constituted by a central sleeve having fins connected to a coaxial peripheral tube by a connection zone fitted with a heating ring. The cold core moves inside the finned cylindrical sleeve so as to come into contact with or be separated from the finned sleeve. In such a device, the contact surface presents a high level of thermal inertia, and it is continuously in thermal contact with heater means constituted by the heating ring. As a result regeneration is not sufficiently rapid to be performed in non-critical time between two successive stages of activity in a device for fabricating semiconductor components.

SUMMARY OF THE INVENTION

The invention seeks to avoid the drawbacks of prior art systems, firstly by eliminating as quickly as possible the ice trapped on the cryogenic trap, and then by returning the cryogenic trap to low temperature more quickly so as to make the trap operational again.

It is attempted to achieve regeneration in a duration of the order of one to a few minutes, so as to be able to perform regeneration in non-critical time between two successive stages of activity in the device for fabricating semiconductor components.

As a result, it is possible to conserve optimum efficiency for the cryogenic trap, without harming the rate of throughput for the chambers, and without increasing the risk of back pollution.

The essential idea of the invention is to make a cryogenic trap whose surface that is in contact with the gases to be trapped presents two states, comprising a first state having a high degree of thermal inertia during gas trapping stages, and a second state having low thermal inertia during regeneration stages.

To achieve these objects, and others, the cryogenic trap of the invention comprises, in a hollow body having a peripheral wall, a contact surface disposed in contact with gases to be trapped, cold generator means for cooling the contact surface to a temperature that is appropriate for condensing and solidifying the gases to be trapped, and heater means for periodically eliminating the layer of ice which becomes deposited on the contact surface during trapping; according to the invention:

the contact surface is a thermally-isolated element, itself having low thermal inertia;

the contact surface is thermally connected to the cold generator means via heat transmission means presenting:

a first state with high conductance for gas trapping stages; and a second state with low conductance for regeneration stages;

the heater means are continuously at a distance from the cold generator means and are provided to heat the contact surface selectively during the regeneration stages; and isolation means are provided for keeping the gases to be trapped away from the cold generator means.

As a result, during the regeneration stage, only the isolated contact surface of low thermal inertia is reheated, thereby requiring less heating energy than in prior art devices. Since the cold generator means are thermally isolated from the contact surface, they are not significantly heated and remain at operating temperature, thus reducing the cooling energy needed to return the cryogenic trap to its operating state, and reducing the time needed for that purpose. During a trapping stage, the heater means are isolated from the contact surface and from the cold generator means, and they are therefore not cooled, whereas the contact surface is cooled rapidly.

In an advantageous embodiment:

the contact surface is the exposed surface of a plate having low thermal inertia and isolated from the peripheral wall of the hollow body, the plate being movable between a trapping position in which it is in contact with the cold generator means while being isolated from the heater means, and a regeneration position in which it is spaced apart from the cold generator means while being in contact with the heater means;

displacement means are provided for selectively moving the plate between its two positions; and the heater means are provided to heat the plate selectively while it is in the regeneration position.

In practice, the general structure of the cryogenic trap can be such that the hollow body has an internal cavity with a proximal zone and a distal zone, the proximal zone being in communication with a main inlet via an access valve, the distal zone containing the cryogenic trap and being in communication with the proximal zone which separates it from the main inlet.

Preferably, the proximal zone is in communication with the pump means via an outlet valve.

Preferably, the cryogenic trap needs to conserve a high level of thermal inertia so as to be in its operating state as rapidly as possible after a regeneration stage. To do this, it is possible, advantageously, to provide for the cold generator means to comprise a cold core having high thermal inertia, placed in the distal zone, and arranged so that the plate comes to bear against the cold core in the trapping position, the cold core itself being thermally coupled to external cold generator means by a cold finger.

In which case, it is advantageous to make provision for:

the plate to move in a cylindrical portion of the cavity of the hollow body with a narrow peripheral space between the peripheral edge of the plate and the wall of the cavity; and means for injecting inert gas to create a flow of inert gas in said narrow peripheral space, said flow of inert gas going from the distal zone towards the proximal zone, and opposing gas to be trapped passing towards the cold core.

In an embodiment, the displacement means comprise said means for generating a flow of inert gas in said narrow peripheral space from the distal zone towards the proximal zone, said means for generating a flow of inert gas being adapted to generate selectively a flow of inert gas at a higher rate of flow serving to move the plate into the regeneration position.

In another embodiment, the displacement means comprise an actuator connected to the plate by one or more insulating rods secured to the plate.

BRIEF DESCRIPTION OF THE DRAWINGS

Other objects, characteristics, and advantages of the present invention appear from the following description of particular embodiments, given with reference to the accompanying figures, in which.

DESCRIPTION OF PREFERRED EMBODIMENTS

In the embodiments shown in the figures, the cryogenic trap comprises a hollow body 3 having a peripheral wall 3a with a main inlet 4 and an outlet 5, both situated in a proximal zone 16 of the hollow body 3. The main inlet 4 is connected via an access valve 2 to a main chamber 1 from which it is desired to extract and trap gases. The outlet 5 is connected via an outlet valve 6 to an outlet pipe 7 connected to pump means (not shown).

A contact surface 13a is disposed at the interface between the proximal zone 16 and a distal zone 17 of the internal cavity in the hollow body 3, so as to be in contact with the gases to be trapped which penetrate into the proximal zone 16 via the main inlet 4.

The cryogenic trap includes cold generator means for cooling the contact surface 13a to a temperature that is appropriate for condensing and solidifying the gases to be trapped. The cold generator means comprise a cold core 11 of large thermal inertia, coupled to external cold generator means 12a by a cold finger 12 which passes through the peripheral wall 3a of the hollow body 3. The cold core 11 is situated in the distal zone 17 on the side of the contact surface 13a opposite from its side adjacent to the proximal zone 16.

In the embodiments shown, the contact surface 13a is the proximal surface of a plate 13 of low thermal inertia, which is associated with the cold core 11 and which is thermally isolated from the peripheral wall 3a of the hollow body 3 by a peripheral space 15.

Figure 4:
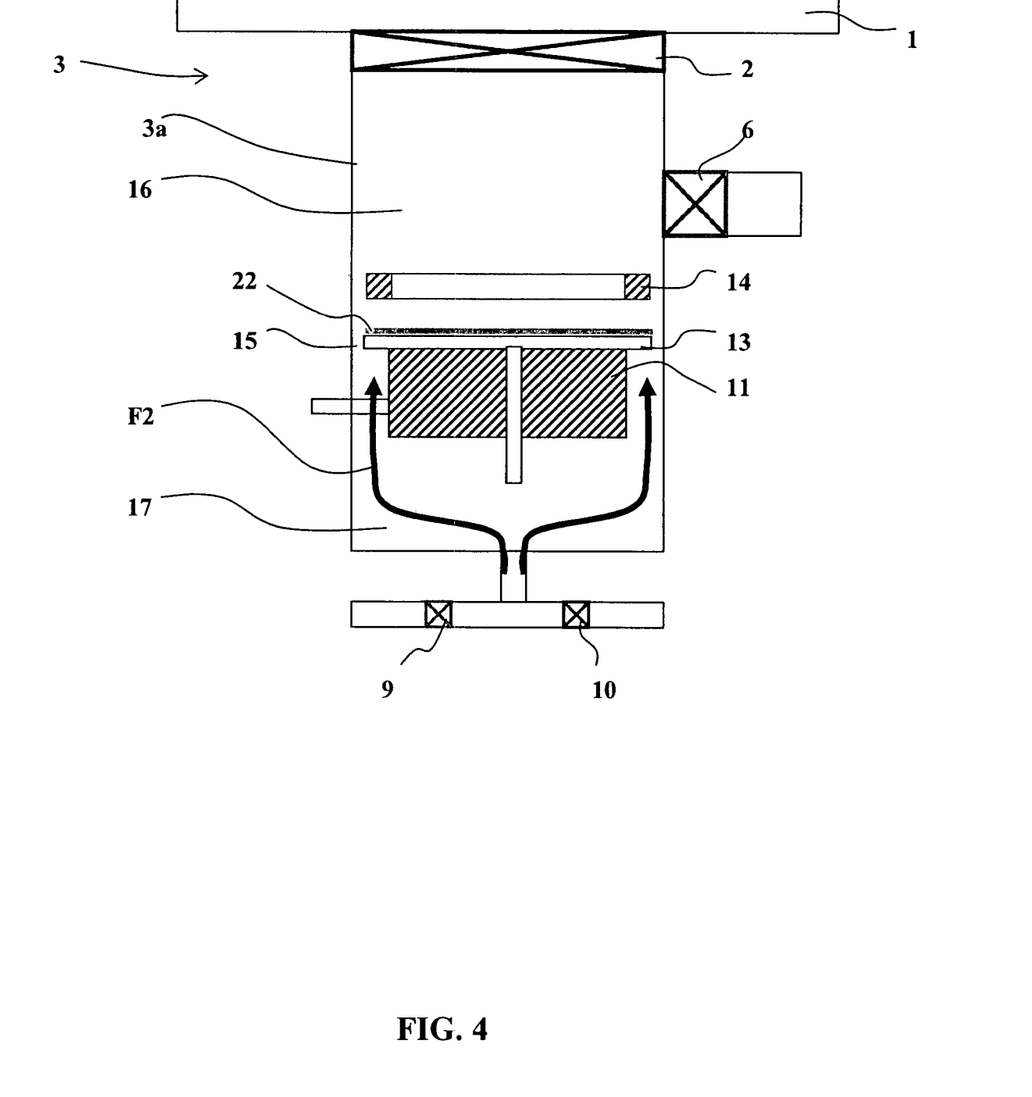
FIG. 4 shows the state of the device during the intermediate stage of injecting a stream of inert gas to raise the plate.
Figure 5:
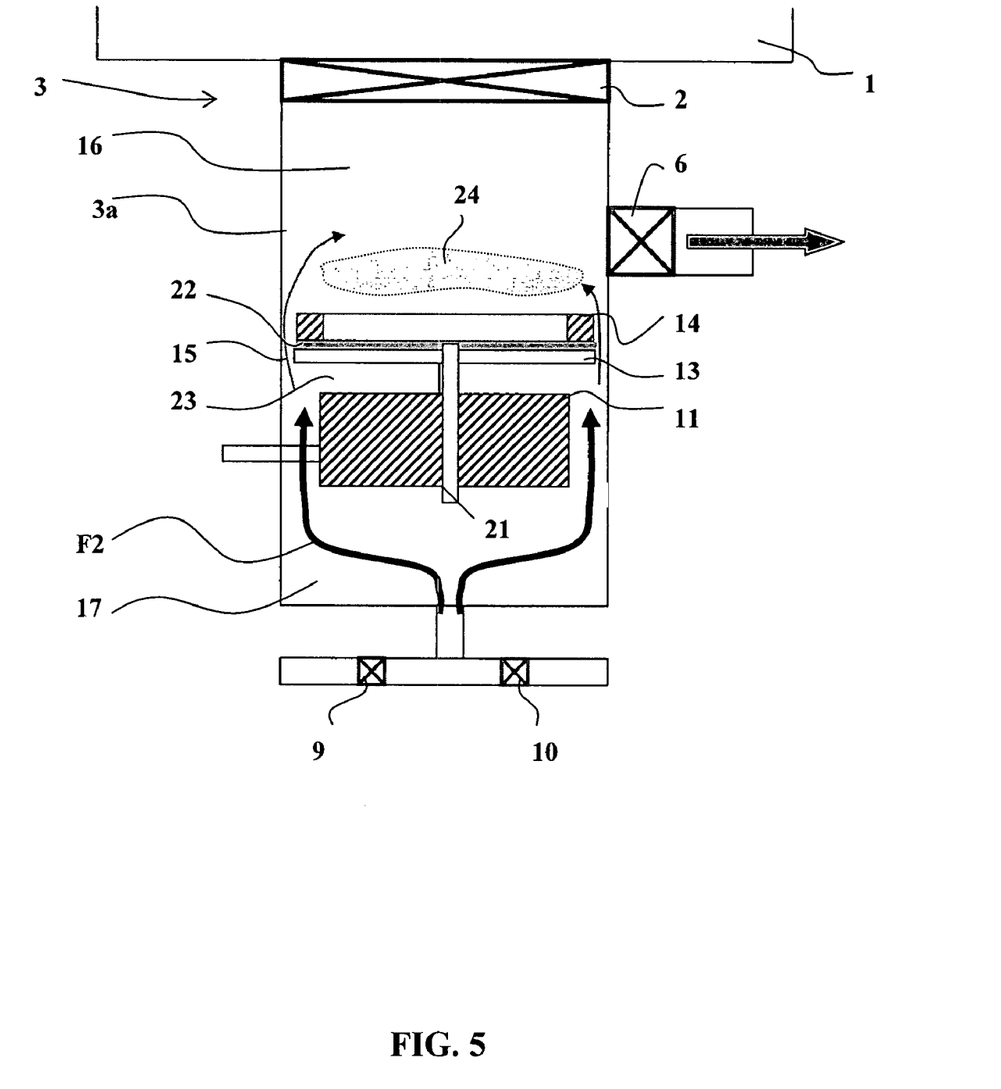
FIG. 5 shows the state of the device in its regeneration position.

The plate 13 can be moved in the interface between the proximal zone 16 and the distal zone 17 of the cavity between a trapping position as shown in FIGS. 1 to 4, and a regeneration position as shown in FIG. 5.

In the trapping position, the plate 13 is in contact with the cold core 11 over a large contact area, so that the large contact area constitutes thermal transmission means presenting high conductance, thereby ensuring good transmission of cold from the cold core 11 to the contact surface 13a, i.e. the proximal surface of the plate 13.

In the regeneration position, the plate 13 is spaced apart from the cold core 11, being separated therefrom by an isolating gap 23 occupied by the gases at very low pressure that are contained in the hollow body 3. As a result, in this regeneration position, the gap 23 constitutes thermal transmission means presenting low conductance.

In order to move the plate 13 between the trapping position and the regeneration position, the plate is guided by guide means such as, for example, a guide shaft 21 (see FIGS. 1 to 5), which shaft is secured to the plate 13 and slides in guides passing through the cold core 11.

Figure 1:
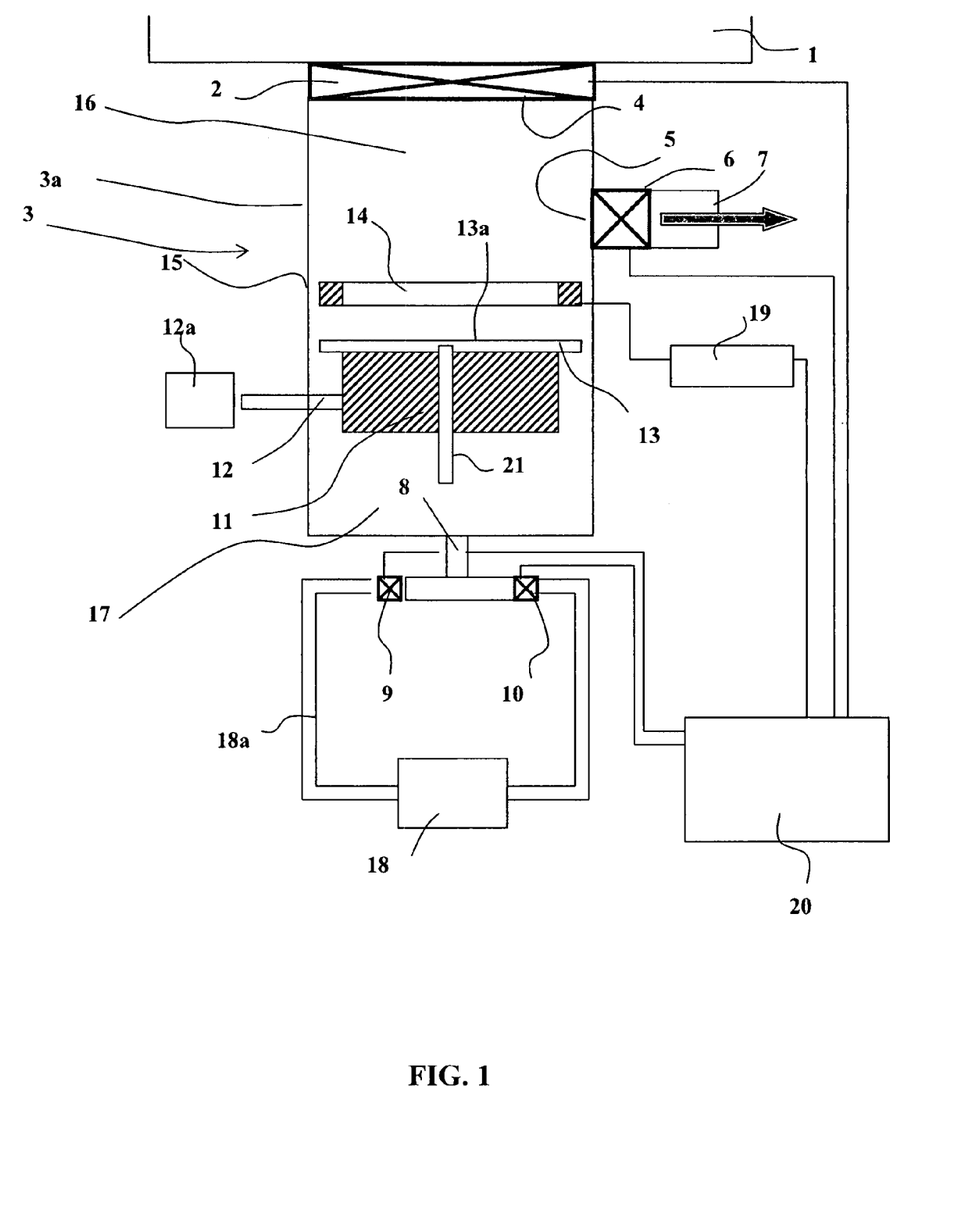
FIG. 1 is a diagrammatic view of a cryogenic trap structure in an embodiment of the present invention, shown in its trapping position.

In the trapping position as shown in FIG. 1, the gases to be trapped penetrate into the proximal zone 16 and come into contact with the cold contact surface 13a. They thus condense on the contact surface 13a. Nevertheless, it is necessary to prevent the same gases from flowing around the cold core 11 since they would also become deposited on the cold core 11, producing a layer of ice over the entire outside surface of the cold core 11, and in particular on its proximal surface against which the plate 13 is to come into contact. In order to prevent the gases for trapping from flowing around the cold core 11, a flow of inert gas such as nitrogen is provided and the inert gas is caused to flow from the distal zone 17 towards the proximal zone 16 of the hollow body 3.

For this purpose, in the embodiment of FIGS. 1 to 5, a source 18 of inert gas such as nitrogen is connected to the distal zone 17 by pipes 18a and control valves 9 and 10 so as to cause the inert gas to penetrate via an inert gas inlet 8 situated in the distal zone 17 away from the proximal zone 16.

A first control valve 9 delivers inert gas at a low rate of flow, while a second control valve 10 delivers inert gas at a greater rate of flow.

Figure 2:
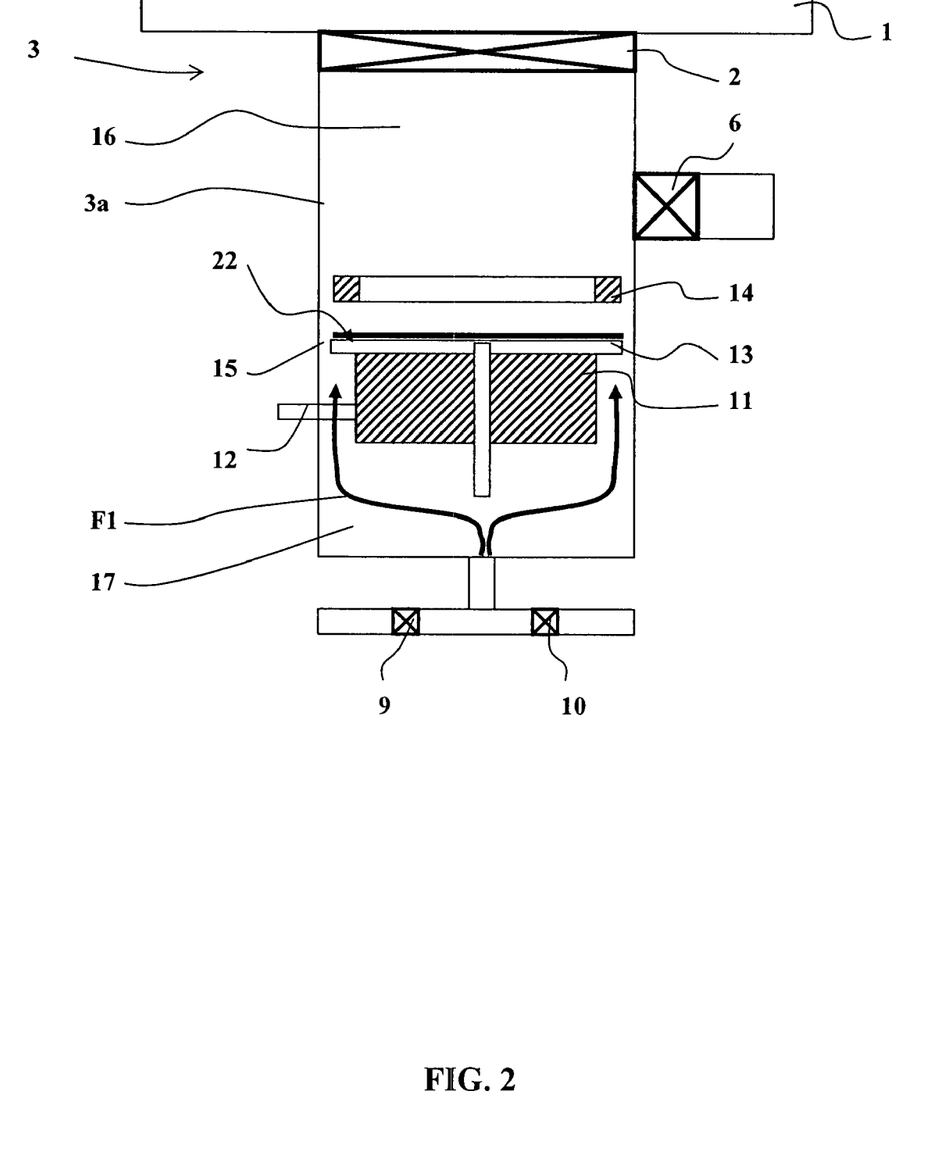
FIG. 2 shows the state of the device and the flow of inert gas in the trapping position.
Figure 3:
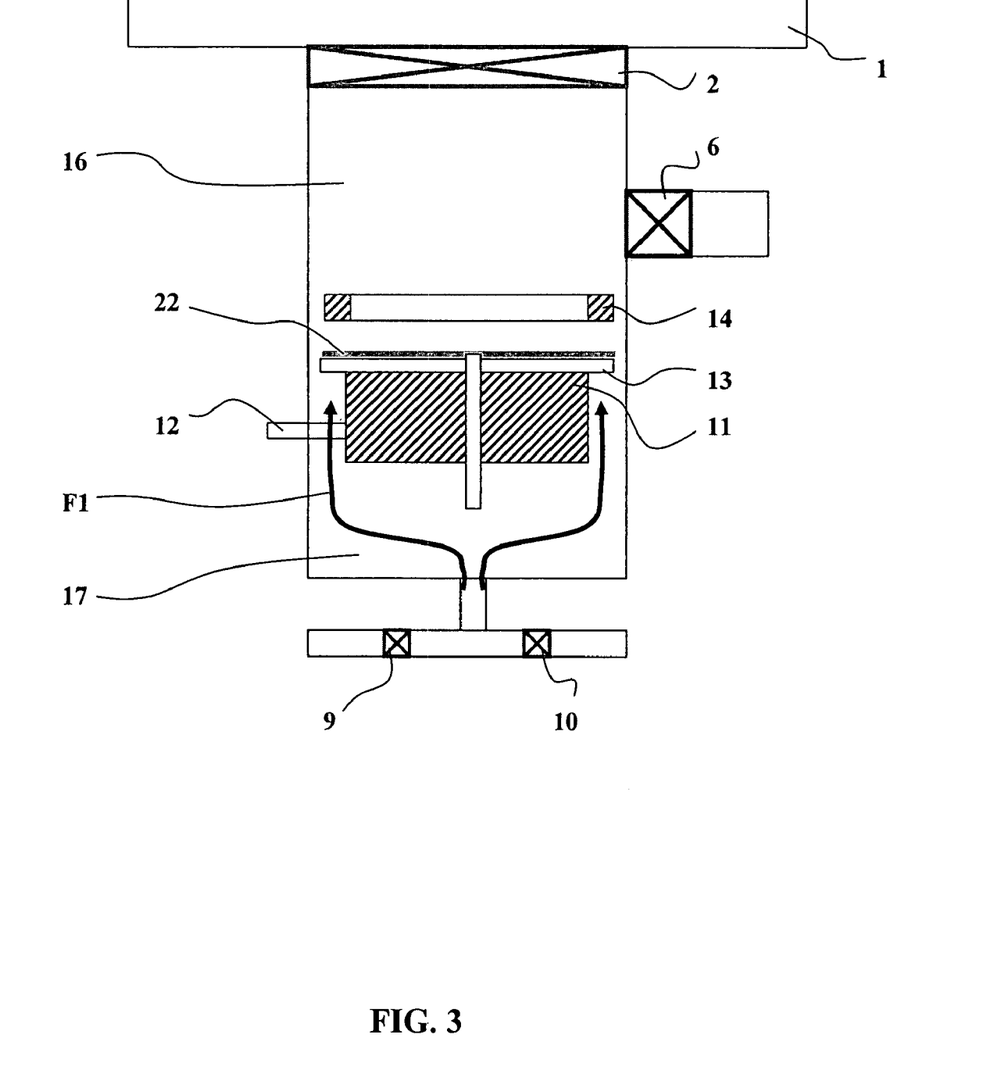
FIG. 3 shows the state of the device during the intermediate stage of heating the heater means in the form of a heater ring.

Under trapping conditions, as shown in FIG. 2, the access valve 2 is open in order to admit the gases for trapping from the chamber 1 into the proximal zone 16. The outlet valve 6 is open. The first control valve 9 is open while the second control valve 10 is closed so as to deliver inert gas at a low rate of flow, which gas flows in the narrow peripheral space 15 between the periphery of the plate 13 and the wall 3a of the hollow body 3. This flow F1 of inert gas at a low rate of flow opposes the passage of gases for trapping from the proximal zone 16 towards the distal zone 17 containing the cold generator means 11, 12. Nevertheless, the flow F1 of inert gas at the low rate of flow is not sufficient for causing the plate 13 to move, which plate thus remains in contact with the cold core 11, and because of its low temperature serves to condense the gases to form a layer of ice 22.

The cryogenic trap also includes displacement means for moving the plate 13 between its trapping position and its regeneration position.

In the embodiment shown in FIGS. 1 to 5, the displacement means comprise said means for delivering inert gas into said peripheral space 15 as a flow going from the distal zone 17 towards the proximal zone 16. Thus, in order to move the plate 13 from the trapping position (FIGS. 1 and 2) to a regeneration position (FIG. 5), the second control valve 10 is opened, and the first control valve 9 is optionally closed, thereby producing a flow of inert gas at a greater rate of flow F2 in the narrow peripheral space 15 going from the distal zone 17 towards the proximal zone 16, as shown in FIGS. 4 and 5. The greater rate of flow F2 moves the plate 13 into the regeneration position, at a distance from the cold core 11 (FIG. 5).

In other modes of regeneration, the means for moving the plate 13 could be means that are mechanical, pneumatic, or electromagnetic, for example.

Figure 6:
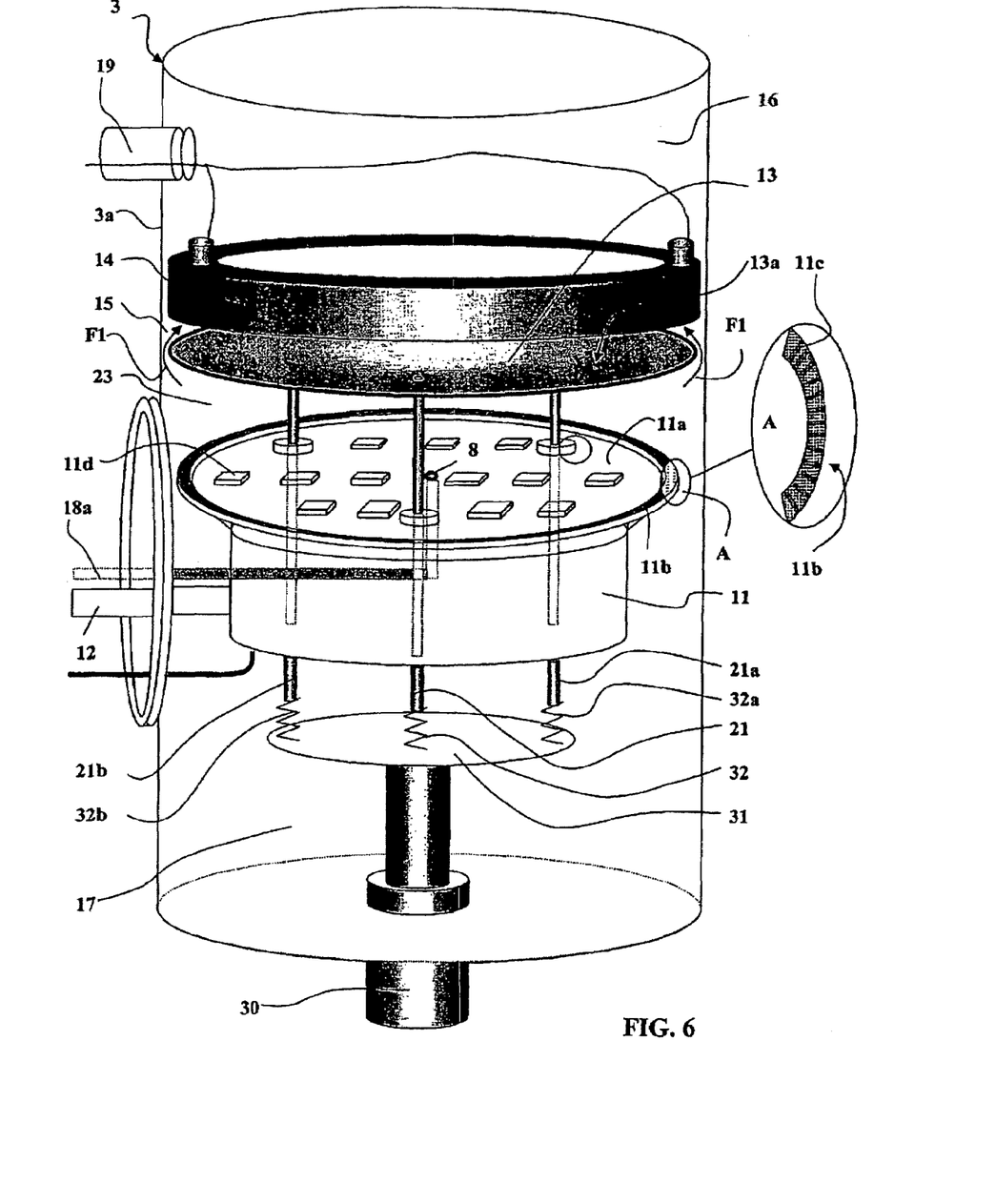
FIG. 6 is a diagrammatic view of a cryogenic trap structure in another embodiment of the invention.

This is the case for the embodiment shown in FIG. 6. In this figure, there can be seen the same essential elements for a cryogenic trap as shown in the embodiment of FIGS. 1 to 5, and these elements are identified by the same numerical references. The hollow body 3 is defined by a cylindrical peripheral wall 3a within which there are placed the other elements of the trap, namely the cold core 11 fed by the cold finger 12, the axial slidable plate 13 in the hollow body 3 constituting the contact surface 13a, and an inert gas inlet pipe 18a for causing an inert gas to penetrate into the distal zone 17 via an inert gas inlet 8, thereby delivering a flow of inert gas F1 flowing in the narrow peripheral space 15 between the periphery of the plate 13 and the wall 3a of the hollow body 3.

In this embodiment, the means for moving the plate 13 comprise an actuator 30 such as a screw actuator, a hydraulic actuator, a stepper motor, or any other known type of actuator, connected to the plate 13 via one or more insulating rods such as the rods 21, 21a, and 21b which pass freely through the cold core 11.

The actuator 30 is located on the side of the cold core 11 that is opposite from its side adjacent to the plate 13, i.e. it is located in the distal zone 17 of the hollow body 3.

In the embodiment shown, the three rods 21, 21a, and 21b are secured to the plate 13, and their presence avoids any turning of the plate 13 about the longitudinal axis of the hollow body 3.

The insulating rods 21, 21a, and 21b are preferably driven by the actuator 30 via a presser plate 31 and respective resilient means 32, 32a, and 32b interposed between the distal ends of the insulating rods 21, 21a, and 21b and the presser plate 31.

The insulating rods 21, 21a, and 21b are preferably separable from the actuator 30 during gas trapping stages, i.e. when the presser plate 31 is spaced apart as far as possible from the cold core 11, the plate 13 then resting on the contact face 11a of the cold core 11. This reduces the thermal inertia of the assembly formed by the plate 13 and the insulating rods 21, 21a, and 21b.

The cryogenic trap of the invention also includes heater means 14 for selectively heating the plate 13 when it is in the regeneration position.

In the embodiments shown in the figures, and in particular in FIG. 1 and FIG. 6, the heater means comprise a heater ring 14 disposed in the cavity of the hollow body 3 facing the contact surface 13a of the plate 13 so that the plate 13 comes into contact with the heater ring 14 via its peripheral zone when it is in the regeneration position. In this way, the heater ring 14 is placed in the proximal zone 16 of the cavity in the hollow body 3, in the proximity of the distal zone 17, but at a distance from the cold core 11.

By way of example, the heater ring 14 can be a ring constituted by an electrical resistance powered by an electrical power supply 19. The heater ring 14 is placed at a distance from the cold core 11, at a distance which is appropriate for defining the gap 23 (FIG. 5) between the plate 13 and the cold core 11 when the plate 13 is in contact with the heater ring 14 in the regeneration position.

Provision can also be made for means that promote thermal connection between the plate 13 and the cold core 11 when the plate 13 is in the trapping position. One of the difficulties is to ensure good thermal connection while the plate 13 and the cold core 11 are immersed in a gaseous atmosphere at very low pressure, i.e. an atmosphere which is therefore thermally insulating.

One such means may consist in injecting helium into the zone between the cold core 11 and the plate 13, since helium is a good conductor of heat.

Another means is to provide a film of heat-conductive material interposed between the cold core 11 and the plate 13, e.g. fixed on one or other of those elements.

The cryogenic trap as shown in FIG. 1 further comprises control means 20 which control sequential operation of the displacement means such as the inert gas injection means 9, 10, the access valve 2, the heater means 14 via their power supply 19, and the outlet valve 6.

Under steady trapping conditions, as shown in FIG. 2, the flow of inert gas F1 is at a low rate of flow and serves solely to oppose gases for trapping passing from the proximal zone 16 of the cavity towards the cold generator means 11, 12. The access valve 2 is open so as to pass the gases for trapping. The outlet valve 6 is in theory open, in order to encourage a flow of gas from the chamber 1 towards the proximal zone 16 of the cavity.

After the trapping stage, an intermediate stage is performed of heating the heater ring 14 (see FIG. 3): the access valve 2 is closed, and the heater ring 4 is electrically powered by the power supply 19 (FIG. 1). The inert gas may continue to be fed at a low rate of flow F1.

As shown in FIG. 4, an intermediate step is then performed of raising the plate 13: the access valve 2 remains closed, the outlet valve 6 remains open, the heater ring 14 continues to be electrically powered, and the control valve 10 is opened to admit inert gas at a greater rate of flow F2 into the distal zone 17 of the cavity and into the peripheral space 15. The rate of flow F2 is selected to be sufficient to separate the plate 13 and lift it away from the cold core 11.

During regeneration, the inert gas continues to flow at a high rate F2, thereby urging the plate 13 against the heater ring 14. The plate 13 is thus raised and therefore thermally isolated from the cold core 11 by means of a gap 23. It is also in contact with the heater ring 14 which is itself heated electrically. This causes the ice 22 that has previously formed on the contact surface 13a of the plate 13 to sublime rapidly. The access valve 2 remains closed while the outlet valve 6 remains open to evacuate the sublimed gases 24. The flow F2 of inert gas such as nitrogen serves to dilute the vapor that results from subliming the ice 22 and to evacuate the vapor via the outlet pipe 7.

Once regeneration is terminated, the plate is returned to its initial position against the cold core 11 by closing the control valve 10, and because of its low thermal inertia it cools very quickly in contact with the cold core 11.

As a result the regeneration procedure is very rapid and the system can be returned to a proper operating condition with its contact surface 13a at the appropriate temperature for trapping after a very short time lapse, of the order of one to a few minutes.

By way of example, the control means 20 comprise a microcontroller or a microprocessor programmed so as to control the control valves 9 and 10, the access valve 2, the outlet valve 6, and the power supply 19 sequentially to perform the above-described sequence of steps.

In the embodiment of FIG. 6, the inert gas is introduced via pipe 18a which opens out via at least one inert gas inlet 8 that is preferably placed in the central zone of the contact face 11a of the cold core 11. This contact face 11a of the cold core 11 is shaped so as to enable the inert gas to diffuse under the plate 13 while it is in the regeneration position, pressed against the contact face 11a of the cold core 11. At the periphery of this contact face 11a there is provided a ring 11b in relief that includes radial grooves 11c, as shown on a larger scale in detail A. Raised bearing zones 11d are spread over the contact surface 11a so as to distribute contact with the plate 13.

As a result, an inert gas such as nitrogen escapes through the inert gas inlet 8, diffuses over the entire bottom surface of the plate 13 so as to provide good transmission of heat between the plate 13 and the cold core 11 while in the regeneration position, and then escapes towards the proximal zone 16, producing the flow F1 in the peripheral space 15 around the plate 13 to oppose penetration of the pumped gases going from the proximal zone 16 towards the distal zone 17 and the cold core 11.

In this embodiment, because the plate 13 is moved by a mechanical actuator, it is possible to provide effective guidance for the plate so as to reduce the peripheral space 15, thereby reducing the amount of inert gas flow F1 that is needed to oppose the pumped gases. The smaller flow F1 makes it possible to further reduce thermal coupling between the plate 13 and the peripheral wall 3a of the hollow body 3, thereby ensuring that the plate 13 has low thermal inertia.

In addition, because the inert gas escapes via a central inert gas inlet 8, thermal contact between the plate 13 and the cold core 11 in the trapping position is improved.

Resilient return means may also be provided to return the plate 13 towards the trapping position in order to provide better contact between the plate 13 and the cold core 11.

The present invention is not limited to the embodiments described explicitly above, but it includes the various generalizations and variations that are within the competence of the person skilled in the art.

The invention claimed is:

1. A cryogenic trap comprising, in a hollow body (3) having a peripheral wall (3a), a contact surface (13a) disposed in contact with gases to be trapped, cold generator means (11, 12) for cooling the contact surface (13a) to a temperature that is appropriate for condensing and solidifying the gases to be trapped, and heater means for periodically eliminating the layer of ice (22) which becomes deposited on the contact surface (13a) during trapping, the trap being characterized in that:
   the contact surface (13a) is a thermally-isolated element (13), itself having low thermal inertia;
   the contact surface (13a) is thermally connected to the cold generator means (11, 12) via heat transmission means presenting:
   a first state with high conductance for gas trapping stages; and
   a second state with low conductance (23) for regeneration stages;
   the heater means (14) are continuously at a distance from the cold generator means (11, 12) and are provided to heat the contact surface (13a) selectively during the regeneration stages; and
   isolation means (F1) are provided for keeping the gases to be trapped away from the cold generator means (11, 12).

2. A cryogenic trap according to claim 1, characterized in that:
   the contact surface (13a) is the exposed surface of a plate (13) having low thermal inertia and isolated from the peripheral wall (3a) of the hollow body (3), the plate (13) being movable between a trapping position in which it is in contact with the cold generator means (11, 12) while being isolated from the heater means (14), and a regeneration position in which it is spaced apart from the cold generator means (11, 12) while being in contact with the heater means (14);
   displacement means (F2) are provided for selectively moving the plate (13) between its two positions; and
   the heater means (14) are provided to heat the plate (13) selectively while it is in the regeneration position.

3. A cryogenic trap according to claim 2, characterized in that the hollow body (3) has an internal cavity with a proximal zone (16) and a distal zone (17), the proximal zone (16) being in communication with a main inlet (4) via an access valve (2), the distal zone (17) containing the cryogenic trap and being in communication with the proximal zone (16) which separates it from the main inlet (4).

4. A cryogenic trap according to claim 3, characterized in that the proximal zone (16) is in communication with the pump means via an outlet valve (6).

5. A cryogenic trap according to claim 3, characterized in that the cold generator means (11, 12) comprise a cold core (11) having high thermal inertia, placed in the distal zone (17), and arranged so that the plate (13) comes to bear against the cold core (11) in the trapping position, the cold core (11) itself being thermally coupled to external cold generator means (12a) by a cold finger (12).

6. A cryogenic trap according to claim 5, characterized in that:
the plate (13) moves in a cylindrical portion of the cavity of the hollow body (3) with a narrow peripheral space (15) between the peripheral edge of the plate (13) and the wall of the cavity; and
means (9, 10) for injecting inert gas create a flow (F1) of inert gas in said narrow peripheral space (15), said flow (F1) of inert gas going from the distal zone (17) towards the proximal zone (16), and opposing gas to be trapped passing towards the cold core (11).

7. A cryogenic trap according to claim 6, characterized in that the displacement means comprise said means for generating a flow of inert gas in said narrow peripheral space (15) from the distal zone (17) towards the proximal zone (16), said means for generating a flow of inert gas being adapted to generate selectively a flow of inert gas at a higher rate of flow (F2) serving to move the plate (13) into the regeneration position.

8. A cryogenic trap according to claim 6, characterized in that the displacement means comprise an actuator (30) connected to the plate (13) by one or more insulating rods (21, 21a, 21b) secured to the plate (13).

9. A cryogenic trap according to claim 8, characterized in that the rod(s) (21, 21a, 21b) pass through the cold core (11), and the actuator (30) is disposed on the side of the cold core (11) that is opposite from its side adjacent to the face (13).

10. A cryogenic trap according to claim 9, characterized in that the rods (21, 21a, 21b) are separable from the actuator (30) during gas trapping stages.

11. A cryogenic trap according to claim 7, characterized in that it includes control means (20) controlling sequential operation of the displacement means (9, 10, 30, 21, 21a, 21b), of the access valve (2), of the heater means (14), and of the outlet valve (6).

12. A cryogenic trap according to claim 2, characterized in that the heater means comprise a heating ring (14) disposed in the cavity of the hollow body (3) facing the contact surface (13a) of the plate (13) in such a manner that the plate (13) comes into contact with the heater ring (14) via its peripheral zone while it is in the regeneration position.

13. A cryogenic trap according to claim 2, characterized in that it includes means for promoting thermal connection between the plate (13) and the cold core (11) while the plate (13) is in the trapping position.

14. A cryogenic trap comprising,
a hollow body;
a contact surface disposed in the hollow body so as to be in contact with a gas to be trapped within the hollow body;
a cold generator ; and
a heater;
wherein the cryogenic trap further comprises at least the following two stages:
a gas trapping stage in which the contact surface is thermally coupled to the cold generator so as to rapidly cool and trap the gas within the hollow body, and
a regeneration stage in which the contact surface is thermally coupled to the heater so as to melt ice accumulated on the contact surface, and wherein, during a transition from the gas trapping stage to the regeneration stage, the contact surface is moved from a position in which the contact surface is thermally coupled to the cold generator to a position in which the contact surface is spaced apart from the cold generator and the distance between the cold generator and the heater does not decrease.

15. The cryogenic trap according to claim 14, wherein the distance between the heater and the cold generator remains fixed during the trapping stage, during the regeneration stage, and during the transition between the trapping stage and the regeneration stage.

16. The cryogenic trap according to claim 14, wherein the gases to be trapped are kept away from the cold generator during trapping and regeneration.

17. A cryogenic trap according to claim 14,
wherein the contact surface is an exposed surface of a plate having low thermal inertia and isolated from a peripheral wall of the hollow body;
wherein the plate is movable between a trapping position in which the plate is in contact with the cold generator while remaining isolated from the heater and a regeneration position in which the plate is spaced apart from the cold generator while remaining in contact with the heater;
wherein the plate is selectively moveable between trapping position and the regeneration position; and
wherein the heater heats the plate when the plate is in the regeneration position.

18. A cryogenic trap comprising, in a hollow body (3) having a peripheral wall (3a), a contact surface (13a) disposed in contact with gases to be trapped, cold generator means (11, 12) for cooling the contact surface (13a) to a temperature that is appropriate for condensing and solidifying the gases to be trapped, and heater means for periodically eliminating the layer of ice (22) which becomes deposited on the contact surface (13a) during trapping, the trap being characterized in that:
the contact surface (13a) is a thermally-isolated element (13), itself having low thermal inertia;
the contact surface (13a) is thermally connected to the cold generator means (11, 12) via heat transmission means presenting:
a first state with high conductance for gas trapping stages; and
a second state with low conductance (23) for regeneration stages;
the heater means (14) is provided to heat the contact surface (13a) selectively during the regeneration stages; and
isolation means (F1) are provided for keeping the gases to be trapped away from the cold generator means (11, 12); and
wherein the contact surface (13a) is the exposed surface of a plate (13) having low thermal inertia and isolated from the peripheral wall (3a) of the hollow body (3), the plate (13) being movable between a trapping position in which it is in contact with the cold generator means (11, 12) while being isolated from the heater means (14), and a regeneration position in which it is spaced apart from the cold generator means (11, 12) while being in contact with the heater means (14); and
wherein displacement means (F2) are provided for selectively moving the plate (13) between its two positions; and wherein the heater means (14) are provided to heat the plate (13) selectively while it is in the regeneration position.

19. A method for operating a cryogenic trap comprising:
providing a cryogenic trap comprising:
- a cold generator,
- a heater, and
- a contact surface;

moving the contact surface from a trapping position in which the contact surface is thermally coupled to a cold generator to a regeneration position in which the contact surface is spaced apart from the cold generator;

thermally coupling the contact surface with the heater while simultaneously thermally decoupling the contact surface from the cold generator; and preventing the heater from moving towards the cold generator during a regeneration stage of the cryogenic trap; and preventing the cold generator from moving towards the heater during the regeneration stage of the cryogenic trap.

20. The method as claimed in claim 19, further comprising keeping the cold generator at operating temperature during the regeneration stage.

21. The method as claimed in claim 19, further comprising performing the following operations during a trapping stage:

thermally coupling the contact surface with the cold generator while simultaneously thermally decoupling the contact surface from the heater, preventing the gases to be trapped from getting into contact with the cold generator; and preventing the heater from moving towards the cold generator and preventing the cold generator from moving towards the heater during the transition between the trapping stage and the regeneration stage.

* * * * *